Figure 1:
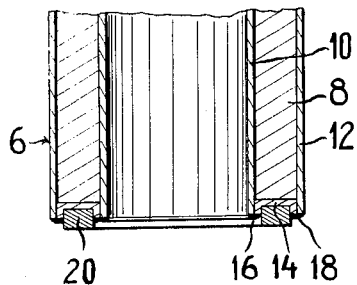

March 29, 1966    B. BOUDOURESQUES    3,243,352

FUEL ELEMENT FOR A NUCLEAR REACTOR

Filed Oct. 7, 1963

United States Patent Office
3,243,352
Patented Mar. 29, 1966

3,243,352
FUEL ELEMENT FOR A NUCLEAR REACTOR
Bernard Boudouresques, Paris, France, assignor to Commissariat a l'Energie Atomique, Paris, France
Filed Oct. 7, 1963, Ser. No. 314,310
Claims priority, application France, Oct. 26, 1962, 913,642
7 Claims. (Cl. 176—79)

This invention relates to a tubular element or cartridge for a nuclear reactor and, more particularly, a tubular fuel element containing fissile material and clad internally and externally with metal sheaths connected by an annular plug which closes the element and is preferably substantially of the same material as the sheaths.

The fuel elements are often stacked one on another in vertical ducts in the reactors. The lower end plug of each element transmits the weight of the element and in certain cases the force which is applied to it either to a support (if each element is provided with an individual support) or to an element located below it (in cases where the elements are stacked on one another). There is a risk that the simultaneous action of pressure and temperature may result in "creep." This problem is particularly acute in the case of tubular fuel elements: the very low ratio between its radical- and circumferential dimensions make it particularly liable to creep.

The compressive stress which determines creep is of course dependent on the contacting surface through which the forces are transmitted to the plug.

The object of the invention is to provide a fuel element whose plug has an increased surface area relative to that of conventional plugs and consequently a greater resistance to creep.

For this purpose, the invention provides a tubular fuel element for a nuclear reactor, comprising a tubular rod of fissile material clad internally and externally with metal sheaths connected by an annular plug preferably of the same material as the sheaths enclosing the element, characterised in that at least one of the sheaths is cylindrical in its central portion and flared at its end portion in order to give the plug a cross-section of contact with the material enclosed in the sheaths which is greater than the cross-section of the rod of fissile material.

It may also be advantageous to use a plug at least one of whose contact faces is provided with asperities in order to subject it to shearing stress during distortion under load.

The invention will be more readily understood by reading the following description and referring to the accompanying drawings illustrating by way of non-limitative example several forms of embodiment of the said invention.

In the drawings:

FIGURE 1 is a diagrammatic sectional view of the end portion of a tubular fuel element of conventional type, shown in longitudinal section along the axis of the element.

Figure 2:
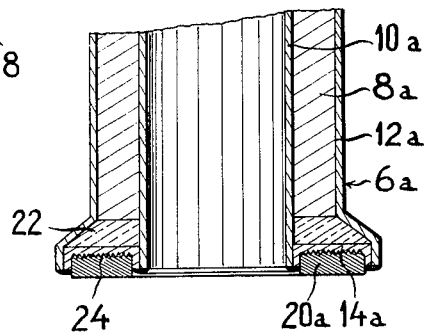
Figure 3:
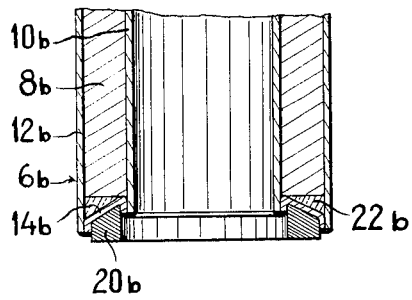
Figure 4:
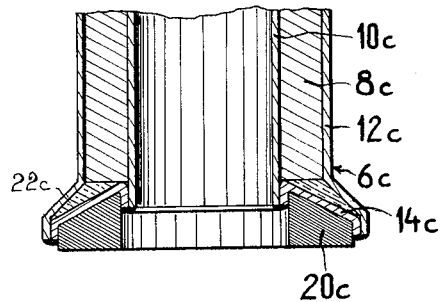

FIGURES 2, 3 and 4, views similar to FIGURE 1, show several forms of embodiment of the present invention.

FIGURE 1 shows the end portion of a conventional annular fuel element 6. This element is constituted by a tube 8 of fissile material such as metallic uranium, clad with an internal sheath 10 and an external sheath 12 which can be provided with fins. The element is closed by a thin plug 14 welded at 16 and 18 to the sheaths 10 and 12. Sheaths and plug are generally made of a magnesium-zirconium alloy having a low content of zirconium.

Arranged in the annular cavity of the plug 14 is a bearing ring 20 through which bearing forces are transmitted. It will be appreciated that the annular surface whereby the plug transmits forces acting on the element (weight and possibly the pressure of the heat-transfer fluid) is relatively small. Moreover, the ratio between the radial size of this surface and its circumferential development is very small, and this condition tends to promote distortion in the radial sense.

The forms of embodiment which will now be described are aimed at increasing the contact surface. In FIGURES 2, 3 and 4 the parts corresponding to those used in FIGURE 1 bear the same reference numeral plus the subscript a, b, or c.

The element 6a shown in FIGURE 2 comprises a tube 8a of fissile material clad with sheaths 10a and 12a; it is closed by a plug 14a which bears on a bearing ring 20a. But between the tube 8a and the plug there is interposed a frusto-conical annular element or disc 22 whose small base end has a surface equal to the cross-section of the tube: thus the surface of the plug can be substantially increased, for example up to twice the general size. On the other hand, of course, the external sheath 12a must have a frusto-conical portion at the level of the element 22.

The annular element 22 is made of a distortion-resistant material; the use of an insulating material such as alumina has the additional advantage of partly protecting the plug from the heat evolved by the fissile material.

In order to combat distortion, it is also possible to combine the structure which has just been described with another which consists in providing at least one of the bearing faces of the plug 14a (lower face 24 in FIGURE 2) with asperities such as circular grooves, knurling, corrugations etc. These asperities prevent the radial distortion of the material constituting the plug and, by creating shearing stresses, subject the metal constituting the plug to a kind of hydrostatic compression. It is thus possible to subject the metal in the central portion of the plug to much greater stresses than those permissible in simple compression.

It will be apparent that the assembly shown in FIGURE 2, where only the external sheath has a frusto-conical portion, can be replaced by others wherein the element 20a remains a body of revolution but has any desired trapezoidal cross-section, which requires that the internal sheath also has a frusto-conical portion. This additional complication, however, is not generally justified.

In some cases it is advantageous to use between the tube 8a and the plug 14a not an insulating element but a heat-conducting cap.

The form of embodiment shown in FIGURE 3 shows another method whereby the contact surface of the plug 14b can be increased. Between the fissile tube and the plug there is interposed a distortion-resistant annular element having a frusto-conical lower face for contacting the plug; the contact surface is thus of course increased in a ratio in accordance with the conicity of the lower face.

Of course, it is possible to combine the arrangements shown in FIGURES 2 and 3 in order to have the fuel element shown in FIGURE 4 wherein there is interposed between the tube of fissile material 8c and the plug 14c an annular element 22c whose lateral surface and lower face are frusto-conical. Thus, for a given maximum diameter, the bearing surface is still greater than that of the element shown in FIGURE 2.

The term "plug" used in the description should not be taken in the limitative sense of a closure element remaining a separate part after the sheaths have been put in position, but simply as designating the end portion of the closed fuel element.

Finally, although all through the foregoing only fuel elements were mentioned, it will be apparent that the invention is equally applicable to fertile elements and to fissile elements.

What I claim is:

1. A fuel element for a nuclear reactor comprising a tube of fissile material clad internally and externally with metal sheaths contacting said tube and connected by an annular plug, a surface for said plug, said surface facing the end of said tube and having a larger surface area than the mean cross-sectional area of said tube, thrust loads between said tube and said plug being distributed over the whole area of said surface, and an annular disc between said tube and said plug.

2. A fuel element as described in claim 1, one annular face of said disc having the same surface area as that of said surface of said plug.

3. A fuel element as described in claim 2, at least one of the sheaths being cylindrical in its central portion and flared at its end portion, said disc fitting in said flared end portion whereby the area of contact between said plug and said disc is greater than the cross-sectional area of said tube.

4. A fuel element as described in claim 2, the mutually contacting surfaces of said plug and of said disc being frusto-conical.

5. A fuel element as described in claim 1 including an annular cavity on the outer side of said plug and a bearing ring in said cavity.

6. A fuel element as described in claim 1 including asperities in at least one of the inner and outer contact faces of said plug whereby said plug is subjected to shearing stresses when subjected to axial load.

7. A fuel element for a nuclear reactor comprising an annular cylindrical tube of fissile material clad internally and externally with metal sheaths contacting said tube and connected by an annular plug, a surface for said plug, said surface facing the end of said tube and having a surface area larger than the mean cross-sectional area of said tube, thrust loads between said tube and said plug being distributed over the whole area of said surface, and an annular bearing disc between said tube and said plug, said disc having a frusto-conical outer face and a planar base of area equal to the cross-sectional area of said tube.

References Cited by the Examiner

UNITED STATES PATENTS

| 3,027,314 | 3/1962 | Vaughan | 176—77 |
| 3,087,882 | 4/1963 | Martin | 176—77 |

FOREIGN PATENTS 802,998  10/1958  Great Britain.

LEON D. ROSDOL, *Primary Examiner.*

CARL D. QUARFORTH, REUBEN EPSTEIN,
*Examiners.*

M. J. SCOLNICK, *Assistant Examiner.*